United States Patent [19]

Berkowitz et al.

[11] Patent Number: 5,007,453
[45] Date of Patent: Apr. 16, 1991

[54] FLUID FLOW CONTROL DEVICE

[76] Inventors: Yehuda Berkowitz; Gavriel M. Hi, both of Edmond Fleg str. 48; Yehuda Mizrahi, Stella Maris Road 30, all of Haifa, Israel

[21] Appl. No.: 502,892
[22] Filed: Apr. 2, 1990

[30] Foreign Application Priority Data

Apr. 19, 1989 [IL] Israel ............................................ 90041

[51] Int. Cl.⁵ ........................................................ F16K 17/34
[52] U.S. Cl. ........................................ 137/458; 137/487.5
[58] Field of Search ....................... 137/458, 460, 487.5, 137/459

[56] References Cited

U.S. PATENT DOCUMENTS

| | | | |
|---|---|---|---|
| 4,249,565 | 2/1981 | Brust | 137/487.5 X |
| 4,333,486 | 6/1982 | Ciccozzi | 137/487.5 X |
| 4,518,955 | 5/1985 | Meyer | 137/487.5 X |
| 4,522,229 | 6/1985 | Var de Moortele | 137/462 X |
| 4,721,128 | 1/1988 | Padilla | 137/487.5 X |
| 4,911,200 | 3/1990 | Ben-Arie | 137/487.5 X |

Primary Examiner—Stephen M. Hepperle
Attorney, Agent, or Firm—Benjamin J. Barish

[57] ABSTRACT

A flow control device insertable into a pressurized fluid line upstream of the fluid utilization device for automatically terminating the flow thereto upon the occurrence of any one of a number of predetermined conditions, such as a leakage in or to the utilization device, an excessive quantity of the fluid supplied to the utilization device, and/or the supply of the fluid at an excessive rate to the utilization device. The control device is electrically controlled by a power supply which is normally disconnected from the control system and is connected thereto only when there is flow to the utilization device, so as to conserve the energy of the power supply when no fluid is flowing to the utilization device.

16 Claims, 2 Drawing Sheets

FLUID FLOW CONTROL DEVICE

FIELD AND BACKGROUND OF THE INVENTION

The present invention relates to a fluid flow control device, for automatically controlling the flow of a fluid to a fluid utilization device. The device is particularly useful for controlling the flow of water to a utilization device such as a washing machine or dishwasher, and is therefore described below with respect to this application.

Various types of fluid utilization devices, such as washing machines or dishwashers, frequently include a valve which is automatically actuated to terminate the flow when a predetermined quantity of the fluid has been received. However, such utilization devices generally do not include any arrangement for detecting other conditions that may occur, such as a leakage in or to the utilization device, or a burst pipe to or in the utilization device which may produce an excessive flow.

On the other hand many electrical systems have been developed for automatically terminating the flow of a fluid upon the occurrence of excessive leakage, and excessive rate of flow, and/or a preselected quantity of fluid supplied to the utilization device examples of such known electrical systems are described in U.S. Pat. Nos. 3,416,560, 4,180,088, 4,249,565, 4,252,088, 4,518,955, 4,735,231 and 4,807,661.

OBJECTS AND SUMMARY OF THE INVENTION

An object of the present invention is to provide an improved flow control device insertable into a pressurized fluid line upstream of the fluid utilization device for automatically terminating the flow thereto upon the occurrence of any one of a number of predetermined conditions, such as a leakage in or to the utilization device, an excessive quantity of the fluid supplied to the utilization device, and/or the supply of the fluid at an excessive rate to the utilization device.

Another object of the present invention is to provide such a fluid control device which is electrically controlled by a power supply, but which power supply is normally disconnected from the control system and is connected thereto only when there is flow to the utilization device, so as to conserve the energy of the power supply when no fluid is flowing to the utilization device.

According to the present invention, there is provided a flow control device insertable into a pressurized fluid line upstream of a fluid utilization device, comprising: a housing containing an inlet port connectable to the fluid line, and an outlet port connectable to the utilization device; a normally-open valve connected to the outlet port; an electrical control system for closing said valve upon the occurrence of the predetermined condition; a power supply for supplying electrical power to said electrical control system; an electrical switch which is normally open to disconnect said power supply from the electrical control system; and a flow sensor for sensing the flow of fluid through said outlet port and effective, when significant fluid flow is sensed, to close said electrical switch and thereby to connect said power supply to the electrical control system.

In the preferred embodiment of the invention described below, the flow sensor comprises: a displaceable member in said housing and defining a control chamber with a portion of the housing; biasing means for biassing the displaceable member in the direction of expanding the control chamber; a fluid connection from the outlet port to the control chamber to lower the pressure therein upon the significant flow of fluid through the outlet port, and thereby to displace the displace able member in the direction of contracting the control chamber; and a switch actuator movable by the displaceable member, when moved to contract the chamber, to close the switch and thereby to connect the power supply to the electrical control system.

According to further features in the described preferred embodiment, the housing includes a main chamber, and a liquid metering device in the main chamber controlling the electrical control system to close the valve when a predetermined quantity of fluid has flowed through the main chamber or when the fluid is flowing through the main chamber at an excessive rate.

According to a still further important feature in the described preferred embodiment, the housing further includes a passageway from the main chamber to the outlet port; a second displaceable member defining a second control chamber with a portion of the housing and movable towards and away from the passageway; biassing means biassing the second displaceable member in the direction of closing the passageway; and a fluid connection from the outlet port to the second control chamber and effective, when there is significant flow through the outlet port, to lower the pressure in the second control chamber and thereby to move the second displaceable member in the direction of opening the passageway. Thus, a very low flow through the outlet port, indicating a leakage in or to the utilization device, will drop the pressure therein and also in the first-mentioned control chamber, to close the electrical switch and thereby to connect the electrical power supply to the electrical control system.

In the described preferred embodiment, both of the mentioned displaceable members are diaphragms. In addition, the fluid connection from the outlet port to the second control chamber includes a restrictor to delay the movement of the second diaphragm for a predetermined interval after movement of the first-mentioned diaphragm. Also the power supply is a battery, and the electrical control system includes a computer energized by the battery when the electrical switch is closed.

It will thus be seen that the flow control device having the above features may be used with any fluid utilization device, such as a washing machine, dishwasher, or the like, and will automatically terminate the flow of the fluid to the utilization device upon detecting a leakage, and excessive quantity, or excessive rate, of fluid flow in or to the utilization device, but does not consume any electricity when there is no fluid flow to the utilization device, thereby enabling relatively small and long-lasting batteries to be used as power supplies.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
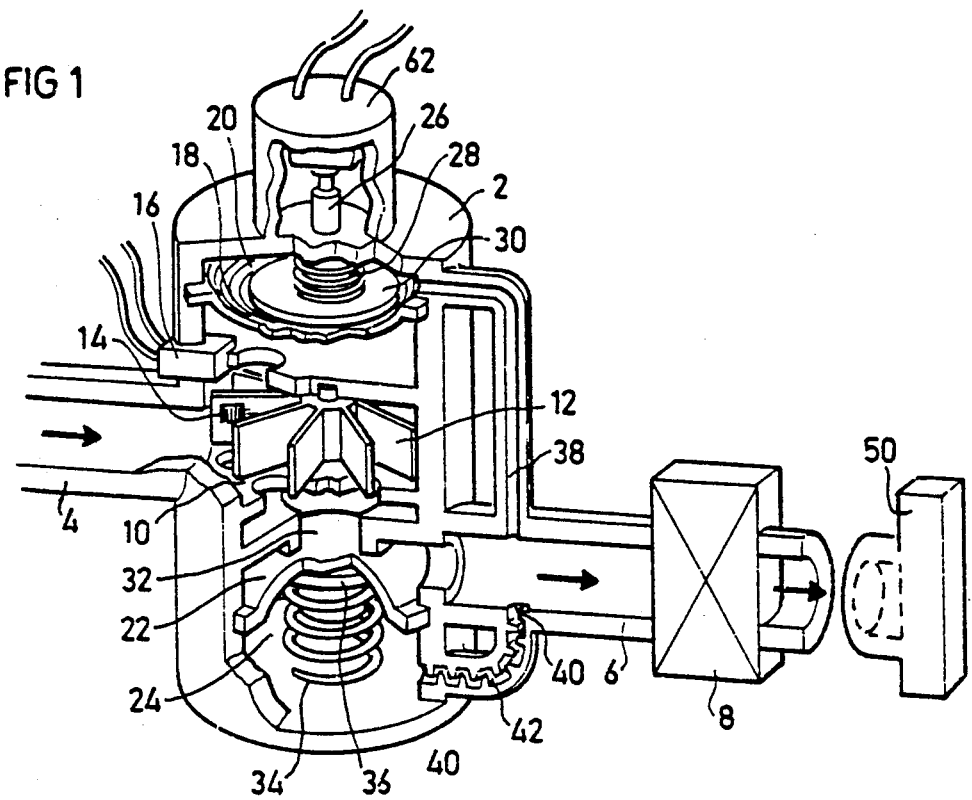
FIG. 1 is a three-dimensional view, partly broken away to show internal structure, illustrating one form of fluid flow control device constructed in accordance with the present invention.

The device illustrated in FIG. 1 is to be used for the control of water to a utilization device, such as a dishwasher. It comprises a housing 2 having an inlet port 4 connectable to the pressurized fluid line upstream of the utilization device (dishwasher), and an outlet port 6 connectable via valve 8 to the utilization device. Housing 2 further includes a main chamber 10 between its inlet port 4 and outlet port 6. A turbine 12 is rotatably mounted within the main chamber 10 for metering the water flowing through the main chamber. For example, one of the vanes of turbine 12 is provided with a magnetic element 14 detected by a magnetic detector 16 to produce an output pulse for each revolution of the turbine.

Housing 2 further includes an upper diaphrgam 18 defining an upper control chamber 20 with the upper portion of the housing, and a lower diaphragm 22 defining a lower control chamber 24 with the lower end of the housing. A rod 26 is secured to the central portion of the upper diaphragm 18 and passes through an opening in the upper end of housing 2. A spring 28 interposed between a disc 30 secured to diaphragm 18 and the upper end of housing 2 normally biasses diaphragm 18 in the direction of expanding chamber 20 and moving rod 26 to a lower position within the housing.

Housing 2 is further formed with a passageway 32 between its main chamber 10 and its outlet port 6. The lower diaphragm 22 is aligned with passageway 32 so as to be displaceable towards or away from the passageway. A spring 34 interposed between the lower wall of housing 2 and a disc 36 secured to the lower diaphragm 22, biasses diaphragm 22 to close passageway 32 and to expand the lower control chamber 24.

A fluid connection 38 is provided between the outlet port 6 and the upper control chamber 20, and another fluid connection 40 is provided between the outlet port 6 and the lower control chamber 24. The latter fluid connection includes a restrictor 42. It will thus be seen that the pressure at the outlet port 6 is directly communicated to the upper control chamber 20, and also to the lower control chamber 24, but the communication to chamber 24 is subjected to a time delay determined by restrictor 42, for a purpose to be described below.

Figure 3:
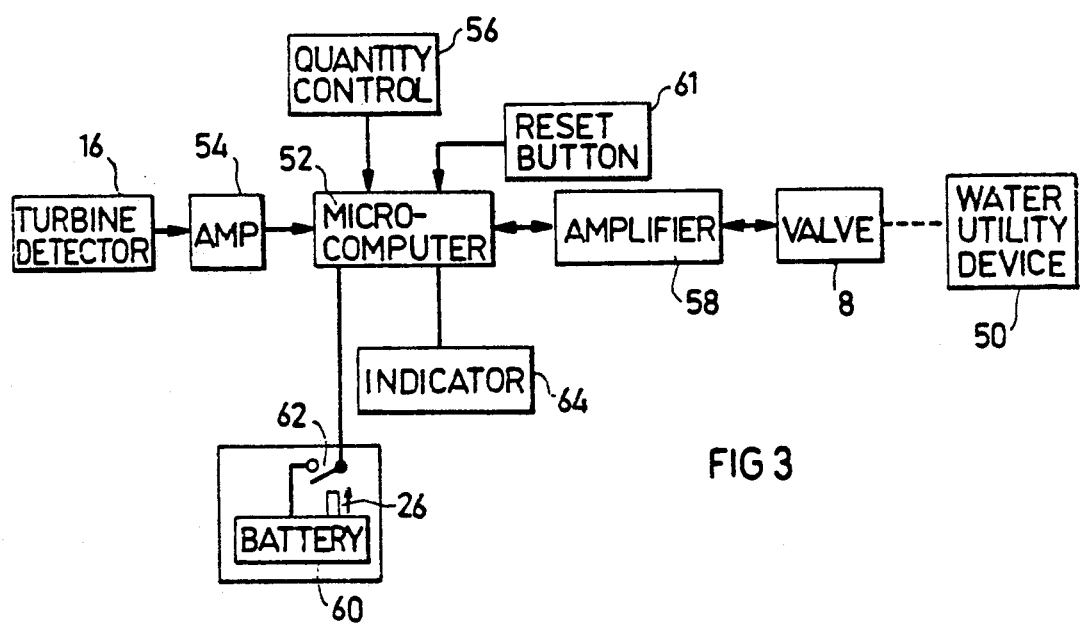
FIG. 3 is a block diagram illustrating the electrical control system in the flow control device of FIGS. 1 and 2.

FIG. 3 illustrates the electrical system for controlling valve 8 between the outlet port 6 and the utilization device shown at 50 in FIG. 3. The control circuit includes a computer 52 having, as one of its inputs, the pulses produced by detector 16 corresponding to the rotations of the turbine 12. These pulses, are amplified in amplifier 54. Computer 52 includes a second input from a quantity control unit 56 which is presettable according to the quantity of the water to be supplied to the water utilization device 50.

Valve 8 between the outlet port 6 and the water utilization device 50 is normally open, but is closed by an output from computer 52, amplified in amplifier 58, upon the occurrence of any one of certain predetermined conditions, as will be described more fully below. The power for the electrical control system, including computer 52 and the operator (e.g., a solenoid, not shown) for valve 8, is supplied from a battery 60 via an electrical switch 62. Electrical switch 62 is normally open, as shown in FIG. 3, but is closed by rod 26 whenever the rod is moved to its upper position by the upper diaphragm 18.

The control system illustrated in FIG. 3 further includes a reset button 61, which may be depressed by the user to reset the computer 52 whenever it has actuated valve 8 to its closed condition to terminate the supply of water to the utilization device. Thus, whenever valve 8 has been closed because of the occurrence of any one of the predetermined conditions to be described below, the valve may be opened by depressing reset button 61; but if the condition which caused the valve to close still persists, the valve will again automatically reclose.

The control system further includes indicators, shown by block 64, to indicate various conditions, e.g., that the system is operating, that the valve 8 has been closed, that the voltage in the battery is low, etc.

The device illustrated in the drawings is used by connecting into the water supply line upstream of the utilization device (e.g., washing machine), with its valve 8 normally open. When so connected, it operates to terminate the supply of the water to the washing machine in the event of any one of the following three conditions occurs: (1) an excessive amount of water, as preset by the quantity control unit 56 (FIG. 3), is supplied to the washing machine; (2) the water is supplied at an excessive rate (e.g., caused by a burst pipe in or to the washing machine); or (3) the washing machine valve is closed but leakage is detected to or in the washing machine.

Figure 2A:
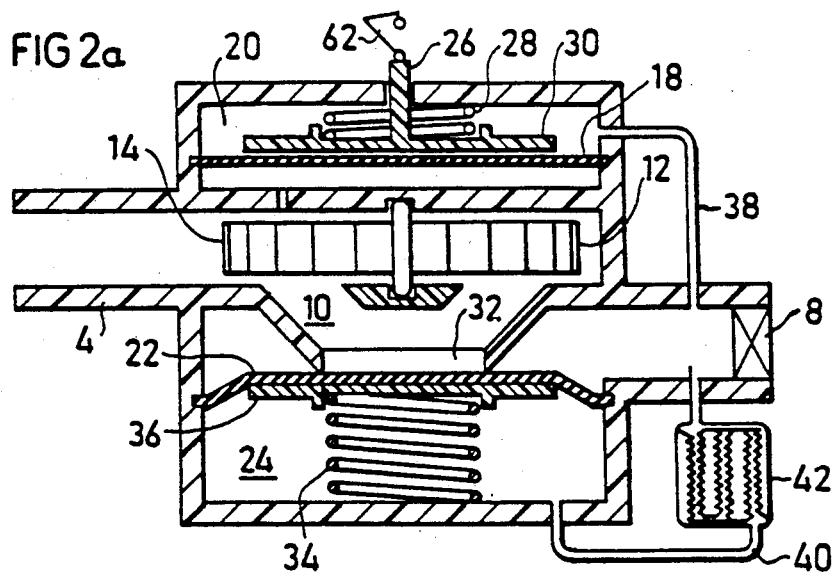
FIGS. 2a-2c are diagrammatic views illustrating various conditions of the flow control device of FIG. 1.

Thus, so long as no water is being supplied to the washing machine (i.e., the washing machine valve is closed), the pressure at the outlet port 6 will be the same as in the main chamber 10. Therefore the pressure in the upper control chamber 20 will also be the same as in the main chamber 10 (because of the fluid connection 38), and the upper diaphragm 18 will accordingly be urged by spring 28 to lower rod 26 (FIG. 2a). Switch 62, connecting the battery supply 60 to the computer 52, will therefore be open. It will thus be seen that no power will be consumed in the electrical control system illustrated in FIG. 3 when no water is being supplied to the washing machine 50.

Figure 2B:
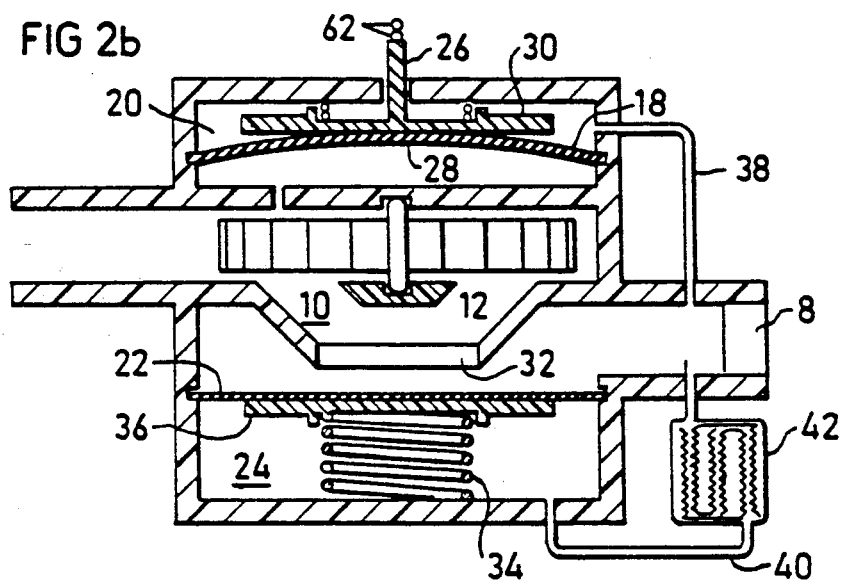

As soon as water is supplied to the washing machine, the pressure at the outlet port 6 will drop. This also causes the pressure within the upper control chamber 20 to drop. The pressure in the main chamber 10 will therefore deflect diaphragm 18 upwardly (tending to contract the upper control chamber 20), thereby raising rod 26 (FIG. 2b) to close switch 62 and to connect the battery supply 60 to the electrical control circuit illustrated in FIG. 3. Valve 8, being normally open, does not interfere with the flow of the water to the washing machine 50.

The flow of the water to the washing machine is metered by turbine 12, particularly its magnetic element 14 on one of its vanes passing in the vicinity of detector 16 fixed to the housing 2, the signals from detector 16 being amplified in amplifier 54 before being inputted into computer 52. When the measured quantity of water corresponds to the quantity preset in the quantity control unit 56, computer 52 automatically closes valve 8 to terminate the flow of the water to the washing machine. The quantity control unit 56 would normally be preset to a quantity slightly larger than the quantity preset by the washing machine 50 itself, so that valve 8 would be closed only when the quantity actually metered by turbine 12 exceeds the quantity fixed by the washing machine, thereby indicating a malfunction in the washing machine.

Should a pipe in or to the washing machine burst, causing the water to be supplied at an excessive rate, this will also be detected by turbine 12 and communicated to computer 52, which will then also automatically close valve 8 to terminate the supply of the water to the washing machine.

Now, should the washing machine be turned off, but nevertheless there be a leakage from or to the washing machine producing a very small flow or trickle of water through the main compartment 10 of the device, this small trickle will not be sufficient to lower the pressure at the outlet port 6, and thereby in the upper control chamber 20, to raise rod 26 for closing switch 62 to connect the battery 60 to the electrical control system. Normally, this would prevent the device from detecting such a leakage and closing valve 8 in response to such a detection. Nevertheless, a leakage is detected, and the valve 8 is closed, in the following manner:

When no water, or very little water, is flowing to the washing machine 50, the pressure at the outlet port 6 would be substantially the same as in the main chamber 10, and this pressure is communicated via connection 40 to the lower control chamber 24. Accordingly, the pressure on the opposite sides of the lower diaphragm 22 would be substantially equal, whereby spring 34 urges the lower diaphragm 22 to close passageway 32, as shown in both FIGS. 2a and 2c.

Figure 2C:
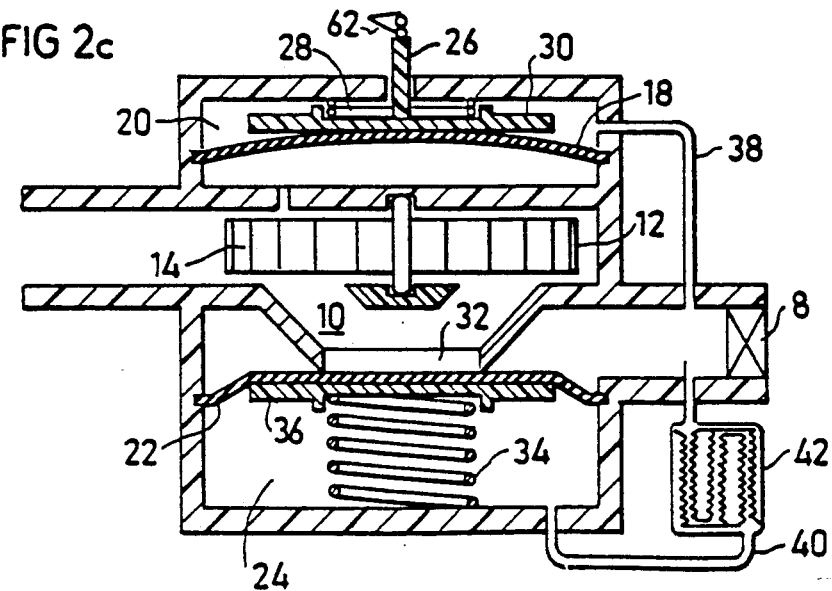

Now, should there be a leakage in or to the washing machine, the pressure at the outlet port 6 will drop because of the closure of passageway 32 by the lower diaphragm 22. This drop in pressure is communicated to the upper control chamber 20, causing the upper diaphragm 18 to be deflected upwardly (in the direction of contracting chamber 20) as shown in FIG. 2c, thereby moving rod 26 upwardly to close switch 62, and thereby to connect the battery supply 60 the electrical control circuit illustrated in FIG. 3. However, since there is no flow of water through the main chamber 10 (or perhaps a very slow trickle), turbine 12 will not rotate. This fact is communicated to computer 52. The computer is pre-programmed to automatically close valve 8 whenever it is powered (by electrical switch 62 being closed by the rising of rod 26), and no output is produced by turbine 12. This is what occurs when a leakage condition is sensed and therefore the computer produces an output effective to close valve 8.

Whenever computer 52 has acted to close valve 8, the valve may be reopened by depressing reset button 61. This depression of the reset button normalizes the counter within the computer which accumulates the total quantity of water flowing through the device, so that if the valve was closed by an excess of water having been supplied to the washing machine, another corresponding quantity of water will be suplied. However, if the condition which caused the valve 8 to be closed was either the supply of the water at an excessive rate (e.g., burst pipe), or the detection of a leakage, that condition will persist, and therefore the electrical control circuit will reclose the valve.

Restrictor 42 is included in the fluid connection 40 between the outlet port 6 and the lower control chamber 24 in order to delay lowering the pressure within the lower control chamber 24 for a short interval, e.g., a few seconds, after the pressure in the upper chamber 20 has been lowered, so as to introduce a hysteresis with respect to the actuation of the electrical switch 62, and thereby avoid successively opening and closing the switch.

While the invention has been described with respect to one preferred embodiment, it will be appreciated that many other variations, modifications and applications of the invention may be made.

What is claimed is:

1. A flow control device insertable into a pressurized fluid line upstream of a fluid utilization device, comprising:

a housing containing an inlet port connectable to the fluid line, and an outlet port connectable to the utilization device;

a normally-open valve connected to the outlet port;

an electrical control system for closing said valve upon the occurrence of a predetermined condition;

a power supply for supplying electrical power to said electrical control system;

an electrical switch which is normally open to disconnect said power supply from the electrical control system;

and a flow sensor for sensing the flow of fluid through said outlet port and effective, when significant fluid flow is sensed, to close said electrical switch and thereby to connect said power supply to the electrical control system; said flow sensor comprising:

a displaceable diaphragm in said housing and defining a control chamber with a portion of the housing;

biasing means for biasing said diaphragm in the direction of expanding said control chamber;

a fluid connection from said outlet port to said control chamber to lower the pressure therein upon the significant flow of fluid through said outlet port, and thereby to displace said diaphragm in the direction of contracting said control chamber;

and a switch actuator movable by said diaphragm, when moved to contract said chamber, to close said switch and thereby to connect the power supply to the electrical control system;

said housing including a main chamber, and a liquid metering device in said main chamber controlling said electrical control system to close said valve when a predetermined quantity of fluid has flowed through said main chamber or when the fluid is flowing through said main chamber at an excessive rate.

2. The device according to claim 1, wherein said housing further includes:

a passageway from the main chamber to the outlet port;

a second diaphragm defining a second control chamber with a portion of the housing and movable towards and away from said passageway;

biasing means biasing said second diaphragm in the direction of closing said passageway;

and a fluid connection from said outlet port to said second control chamber and effective, when there is significant flow through said outlet port, to lower the pressure in the second control chamber and thereby to move the second diaphragm in the direction of opening said passageway;

whereby a very low flow through the outlet port, indicating a leakage in or to the utilization device, will drop the pressure therein and also in the first-mentioned control chamber, to close said electrical switch and thereby to connect the electrical power supply to said electrical control system.

3. The device according to claim 2, wherein said fluid connection from said outlet port to said second control chamber includes a restrictor to delay the movement of said second diaphragm for a predetermined interval after movement of the first-mentioned diaphragm in the first-mentioned control chamber.

4. The device according to claim 1, wherein said metering device comprises a turbine rotated by the water passing through said main chamber, sensing the number of rotations and the rate of rotation of the turbine, for outputting electrical signals to the electrical control system to close said valve when a predetermined quantity of fluid has flowed through said main chamber or when the fluid is flowing through said main chamber at an excessive rate.

5. The device according to claim 1, wherein said power supply is a battery, and said electrical control system includes a computer energized by said battery power supply when said electrical switch is closed.

6. The device according to claim 5, wherein said electrical control system further includes a quantity control device which is presettable to define a predetermined quantity of the fluid to be fed to the utilization device, following which the computer closes said valve.

7. The device according to claim 6, wherein said electrical control system further includes a depressable reset button which, upon depression, causes the computer to open said valve.

8. A flow control device insertable into a pressurized fluid line upstream of a fluid utilization device, comprising:
  a housing containing an inlet port connectable to the fluid line, an outlet port connectable to the utilization device;
  a normally-open valve connected to the outlet port;
  an electrical control system for closing said valve upon the occurrence of a predetermined condition;
  a power supply for supplying electrical power to said electrical control system;
  an electrical switch which is normally open to disconnect said power supply from the electrical control system;
  and a flow sensor for sensing the flow of fluid through said outlet port and effective, when significant fluid flow is sensed, to close said electrical switch and thereby to connect said power supply to the electrical control system; and
  said housing further including a main chamber, and a liquid metering device in said main chamber controlling said electrical control system to close said valve when a predetermined quantity of fluid has flowed through said main chamber or when the fluid is flowing through said main chamber at an excessive rate.

9. The device according to claim 8, wherein said flow sensor comprises:
  a displaceable member in said housing and defining a control chamber with a portion of the housing;
  biassing means for biassing said displaceable member in the direction of expanding said control chamber;
  a fluid connection from said outlet port to said control chamber to lower the pressure therein upon the significant flow of fluid through said outlet port, and thereby to displace said displaceable member in the direction of contracting said control chamber;
  and a switch actuator movable by said displaceable member, when moved to contract said chamber, to close said switch and thereby to connect the power supply to the electrical control system.

10. The device according to claim 9, wherein said displaceable member is a diaphragm.

11. The device according to claim 8, wherein said housing further includes:
  a passageway from the main chamber to the outlet port;
  a second displaceable member defining a second control chamber with a portion of the housing and movable towards and away from said passageway;
  biassing means biassing said second displaceable member in the direction of closing said passageway;
  and a fluid connection from said outlet port to said second control chamber and effective, when there is significant flow through said outlet port, to lower the pressure in the second control chamber and thereby to move the second displaceable member in the direction of opening said passageway;
  whereby a very low flow through the outlet port, indicating a leakage in or to the utilization device, will drop the pressure therein and also in the first-mentioned control chamber, to close said electrical switch and thereby to connect the electrical power supply to said electrical control system.

12. The device according to claim 11, wherein said second displaceable member is also a diaphragm.

13. The device according to claim 12, wherein said fluid connection from said outlet port to said second control chamber includes a restrictor to delay the movement of said second diaphragm for a predetermined interval after movement of the first-mentioned diaphragm in the first-mentioned control chamber.

14. The device acording to claim 13, wherein said metering device comprises a turbine rotated by the water passing through said main chamber, sensing the number of rotations and the rate of rotation of the turbine, for outputting electrical signals to the electrical control system to close said valve when a predetermined quantity of fluid has flowed through said main chamber or when the fluid is flowing through said main chamber at an excessive rate.

15. The device according to claim 8, wherein said power supply is a battery, said electrical control system includes a computer energized by said battery power supply when said electrical switch is closed, and a quantity control device which is presettable to define a predetermined quantity of the fluid to be fed to the utilization device, following which the computer closes said valve.

16. The device according to claim 8, wherein said electrical control system further includes a depressable reset button which, upon depression, causes the computer to open said valve.

* * * * *